United States Patent [19]

Lavin et al.

[11] Patent Number: 5,781,422

[45] Date of Patent: Jul. 14, 1998

[54] UNINTERRUPTIBLE POWER SUPPLY WITH AC AND DC POWER INPUTS

[75] Inventors: James Vincent Lavin, Glasgow; Neil Glachan, Fife, both of Scotland

[73] Assignee: Magnum Power Solutions Limited, Livingston, Scotland

[21] Appl. No.: 669,552

[22] PCT Filed: Jan. 12, 1995

[86] PCT No.: PCT/GB95/00058

§ 371 Date: Dec. 30, 1996

§ 102(e) Date: Dec. 30, 1996

[87] PCT Pub. No.: WO95/19654

PCT Pub. Date: Jul. 20, 1995

(Under 37 CFR 1.47)

[30] Foreign Application Priority Data

Jan. 12, 1994 [GB] United Kingdom ............ 9400499

[51] Int. Cl.⁶ .................. H02M 5/45; H02M 3/335; H02J 7/00

[52] U.S. Cl. .................. 363/37; 363/17; 307/64; 307/66

[58] Field of Search ............ 363/37, 17, 132, 363/26; 307/66, 64, 38, 39, 41, 48, 46

[56] References Cited

U.S. PATENT DOCUMENTS

| 4,564,767 | 1/1986 | Charych | 307/66 |
| 4,672,228 | 6/1987 | Swoboda | 307/66 |
| 4,719,550 | 1/1988 | Powell et al. | 307/46 |
| 5,289,045 | 2/1994 | Lavin et al. | 307/64 |
| 5,319,249 | 6/1994 | Frank et al. | 307/66 |

FOREIGN PATENT DOCUMENTS

| 0243061 | 4/1987 | European Pat. Off. . |
| 8514278 | 9/1985 | France . |
| 9107803 | 5/1991 | WIPO . |

*Primary Examiner*—Peter S. Wong
*Assistant Examiner*—Bao Q. Vu
*Attorney, Agent, or Firm*—Gregory L. Roth

[57] ABSTRACT

An uninterruptible power supply includes first and second inputs for receiving AC and DC power respectively, first and second switching circuits, an auxiliary power supply, a transformer, a selection circuit, an A to DC converter and a hold-up capacitor. The hold-up capacitor can provide energy storage for both AC and DC operation.

12 Claims, 4 Drawing Sheets

UNINTERRUPTIBLE POWER SUPPLY WITH AC AND DC POWER INPUTS

BACKGROUND OF THE INVENTION

The present invention relates to uninterruptible power supplies and in particular, though not necessarily, to uninterruptible power supplies for computers.

Uninterruptible power supplies are required for many computer installations such as network file servers, telecommunications equipment or other applications where a sudden loss of power would create an unacceptable and costly occurrence. Such occurrences include the loss of data during a data transfer or the shutdown of an entire business as a result of the loss of a computer.

Presently available uninterruptible power supplies are placed between the AC utility socket and the AC utility input for the computer or other electrical device which must receive continuous electrical power. The power supply includes a battery providing electrical energy in the event of a power failure, an AC to DC converter and an inverter converting electrical energy back from DC to AC. The electrical device's internal power supply then receives the AC output from the uninterruptible power supply and in turn converts this to the various regulated and unregulated voltages required for the device.

The AC to DC converter of the conventional uninterruptible power supply converts the AC power to DC power at approximately the battery voltage with a trickle charge being available to ensure that the battery, generally a lead acid battery, remains charged at all times. The inverter then reconverts the DC energy From the DC battery voltage back to an AC power supply approximating standard utility AC power. In the event of a power failure, the internal DC voltage from the AC to DC converter drops below the battery output voltage. This is sensed and causes the battery to begin supplying the DC power to the inverter in place of the DC to AC converter. The battery continues to supply power until AC utility power is restored or the battery is discharged.

While such arrangements work satisfactorily, they are relatively expensive and inefficient. They must work at relatively high power levels, typically two hundred to three hundred watts, and are typically only 75 to 85 percent efficient. Consequently, substantial amounts of power must be dissipated within the uninterruptible power supply and large and expensive components are required.

In addition, the AC to DC converter, the inverter, and corresponding control circuits must be duplicated within the conventional power supply of the device being powered and the customer must therefore in effect purchase two power supplies; a standard device power supply and an uninterruptible power supply.

For the above reasons, uninterruptible power supplies are used only in relatively expensive devices where device size is not a consideration.

There is disclosed in WO 91/07803 an uninterruptible power supply which incorporates the functions of a standard, internal, power supply and which substantially eliminates the duplication of components which occurs with standard uninterruptible power supplies. This power supply is only arranged, however, to receive AC input power and makes no provision for receiving DC input power.

SUMMARY OF THE INVENTION

It is an object of the present invention to overcome or at least mitigate the disadvantages of known uninterruptible power supplies.

It is a second object of the present invention to provide an uninterruptible power supply which is cheap, compact and energy efficient and which can receive DC input power.

It is a third object of the present invention to provide an uninterruptible power supply which incorporates the functions of a standard internal power supply but which substantially avoids the duplication of major components.

According to a first aspect of the present invention there is provided an uninterruptible power supply comprising first and second inputs for receiving AC and DC power respectively, first and second switching circuits coupled to corresponding ones of the inputs, an additional auxiliary power supply coupled to said first and second inputs, and selection means for selectively providing power from at least one of the first switching circuit, the second switching circuit and the auxiliary power supply, to an output of the power supply.

According to a second aspect of the present invention there is provided an uninterruptible power supply comprising:

first and second inputs for receiving AC and DC power respectively;

first and second switching circuits coupled to said first and second inputs respectively, the switching circuits being operable to enable either AC power or DC power to be selected for consumption;

a transformer having a primary winding coupled to the output of the first switching circuit, a tertiary winding coupled to the output of the second switching circuit, and a secondary winding arranged to provide DC power to an output of the supply; and an auxiliary power supply including energy storage means, coupled to said first and second inputs to receive either AC or DC power therefrom and having an output coupled to the supply output through auxiliary switching means, which means is arranged to couple power stored in the storage means of the auxiliary power supply to the supply output when the power available on the AC and/or DC inputs falls below a predefined limit.

According to a third aspect of the present invention there is provided an uninterruptible power supply comprising an auxiliary power supply for supplying power to an output through an auxiliary switching circuit, a transformer, an AC to DC converter for receiving AC power and coupled between an AC input and a primary winding of the transformer through a first switching circuit, and a DC to DC converter for receiving DC power and coupled between a DC input and a tertiary winding of the transformer through a second switching circuit, the transformer being provided with a secondary winding for coupling power from the primary and tertiary windings to said output, the uninterruptible power supply including a pulse width modulator coupled to the first, second and auxiliary switching circuits for controlling said switching circuits to regulate the outputs thereof.

According to a fourth aspect of the present invention there is provided an uninterruptible power supply comprising:

a connection to standard AC utility power and/or a connection to DC utility power in the voltage range 18V–70V;

an AC to DC converter;

a pulse width modulator capable of driving three switching circuits which control a regulated output signal;

a transformer having a primary and a tertiary winding, connected to respective switching circuits, and one or more secondary windings; and an internally connected auxiliary power source, such as a battery, coupled to provide DC power in the event that the AC to DC or DC to DC converters are unable to provide DC power because of a utility power failure.

In the case or the AC utility being the prime power source, because the battery connects internally of the regulating power supply for the device being powered, the conventional AC to DC converter need not be duplicated and the efficiency losses associated with the duplicated converters may be substantially eliminated. The internal power supply may thus facilitate reduced cost, improved efficiency and reduced power dissipation.

In the DC input mode the AC filter capacitor may be used to make possible the same power supply hold up as when in AC input mode. The input filter capacitor is shared by both modes.

A battery small enough to fit within a standard personal computer power supply can provide auxiliary power to run a typical personal computer for six to seven minutes. Longer auxiliary power intervals can be achieved by utilising larger, external batteries with internal connection to the regulated power supply.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF THE INVENTION

Figure 1:
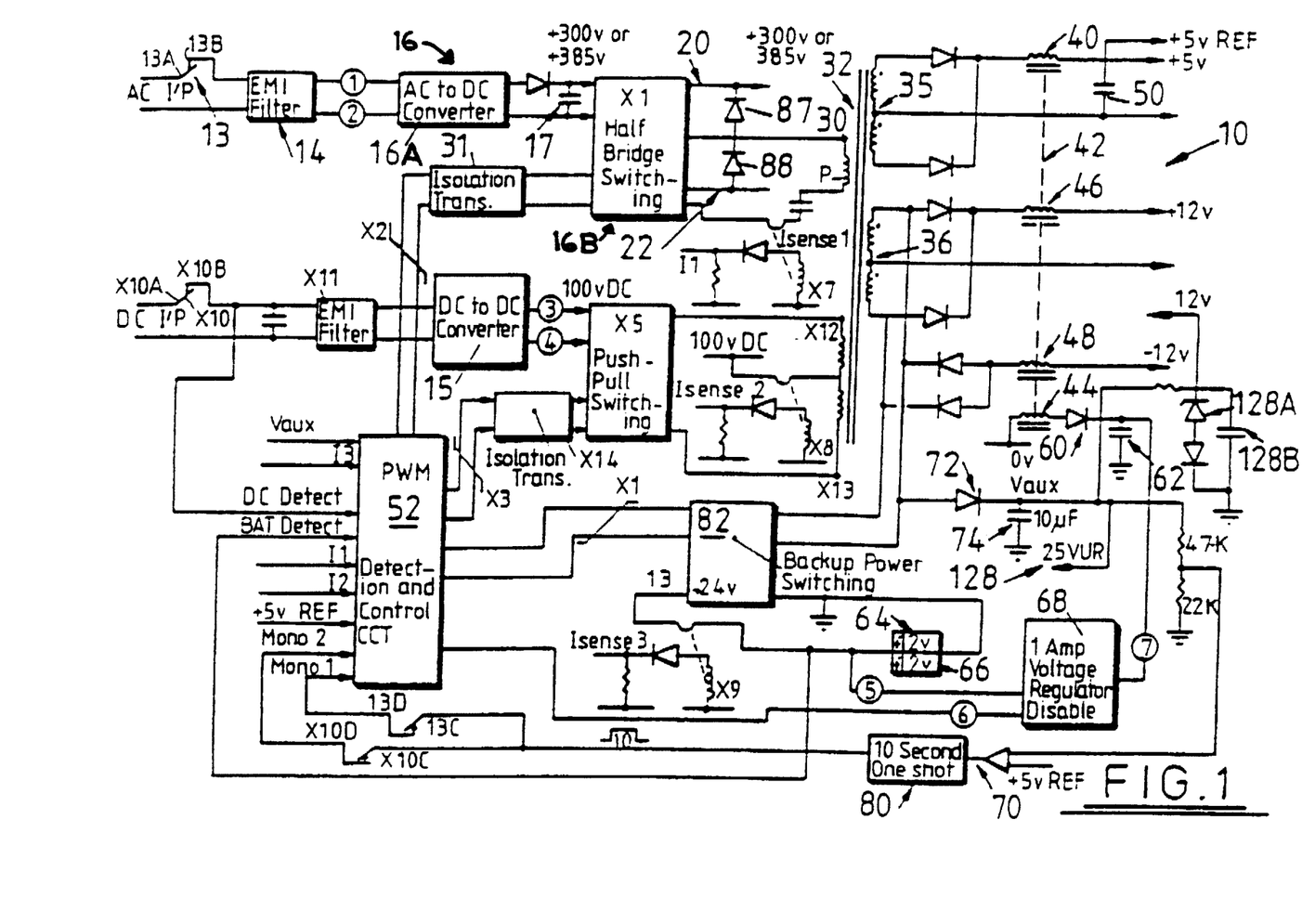
FIG. 1 shows an uninterruptible regulating supply embodying the present invention.

There is shown in FIG. 1 an uninterruptible power supply (UPS) which can be coupled to either an AC input or a DC input via switches 13 and X10 respectively. Considering firstly the AC operating mode, as will be apparent from FIG. 1, the double pole, single throw, main power switch 13 has a first terminal 13A shown closed against a contact 13B to conduct power from an AC utility input to an electromagnetic radiation interference (EMI) filter 14. A second terminal 13C is shown closed against a contact 13D to communicate a control signal, from a 10 second one-shot circuit 80, to respective enable inputs of a voltage regulator 68 and a power switch 82 as will be described hereinbelow. Opening of the main power switch 13 opens both the contacts 13B and 13C.

Figure 2A:
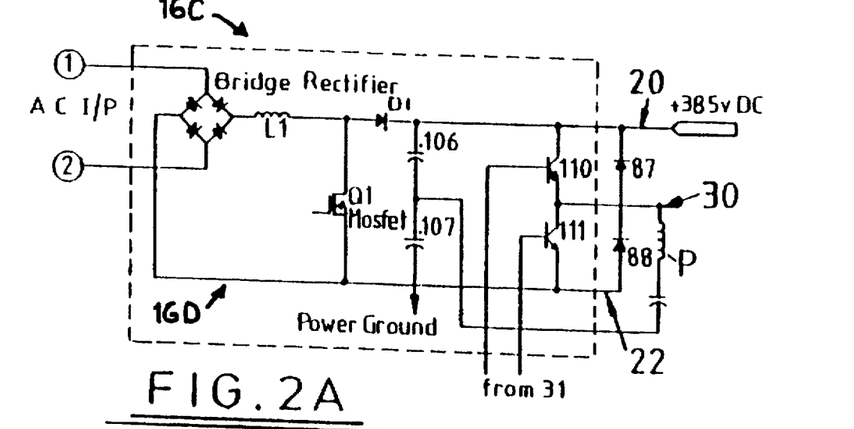
FIG. 2A shows an AC to DC converter of the power supply of FIG. 1.
Figure 2B:
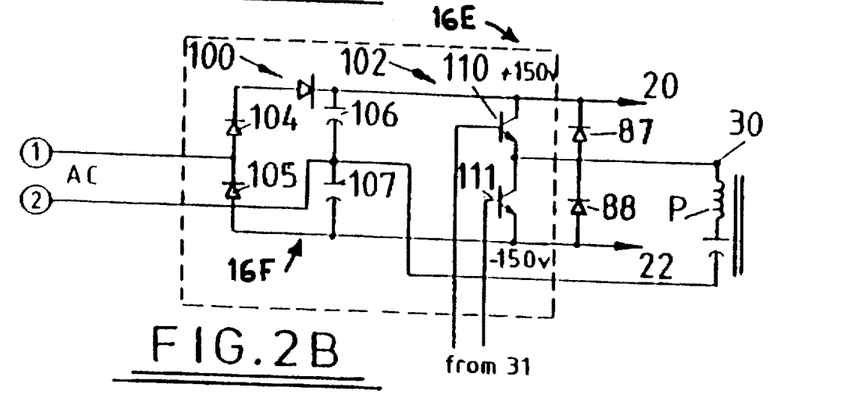
FIG. 2B shows an alternative AC to DC converter of the power supply shown in FIG. 1.

Referring further to FIGS. 2A and 2B, in AC mode, an AC to DC converter and switch circuit 16 receives AC power of 110V or 240V through the EMI filter 14 and includes an AC to DC converter 16A and a half bridge switching circuit 16B. AC to DC converter and switch circuit 16 can be implemented as either (a) an AC to DC converter and switch circuit 16C having a boost regulator circuit 16D to full wave rectify the AC power and drive DC power rails 20, 22 with unreferenced 385 volts DC (FIG. 2A) or (b) an AC to DC converter and switch circuit 16E having a conventional doubler circuit 16P to rectify the AC power and drive the DC power rails 20, 22 with unreferenced 300 volts DC (FIG. 2B). When the FIG. 2B circuit is fed from a 110V supply one of its capacitors 106, 107 is shorted out by a switch (not shown).

A half bridge switching circuit or inverter X1 16B includes transistors which selectively and alternately couple the primary winding terminal 30 of a transformer 32 via diodes 87, 88 to he plus and minus DC voltage rails 20, 22 in response to pulse width modulated switching control signals generated by a pulse width modulation unit 52 and transmitted to the switching circuit X1 via an isolation transformer 34. The primary winding P of the transformer 32 is thus continually energised with pulse width modulated plus and minus 150 volt alternating power signals. As explained subsequently, the duty cycle of the pulse width modulation is selected to maintain a selected reference voltage at one of the outputs of the power supply 10.

A capacitor 17 is coupled across the output lines of the AC to DC converter, before the switching circuit X1, and acts to maintain the voltage at 300V, or 385V, for a short time following AC power loss. This prevents the auxiliary power supply from switching in where the AC power loss or drop occurs only for a very short period.

Although additional secondary windings may be employed as desired, in the embodiment of FIG. 1, the transformer 32 has two sets of centre tapped secondary windings 35, 36 each arranged as a push-pull winding pair. The first set of secondary windings 35 is selectively wound to produce a 5 volt output while the second set of secondary windings 36 is wound to produce plus and minus 12 volt outputs.

The first set of secondary windings 35 are coupled through a pair of rectifying diodes to a winding 40 of a power distributing inductor 42 and then to a +5 volt "regulated" output. The inductor 42 is a conventional power distributing powdered permalloy core inductor which enables the regulated voltages to be maintained notwithstanding unequal current drains from the different regulated voltage outputs. A filter capacitor 50 interconnects the +5 volt and common terminals of the secondary winding 35. A signal +5VREF is taken from the +5 volt terminal and is returned as a reference input, together with a current feedback signal from a circuit Isense-1 arranged to sense the current flowing in the primary winding of the transformer 32, to a pulse width modulation control circuit which forms part of the unit 52.

The PWM circuit (UC3846) of unit 52 is commercially available in integrated form from Texas instruments Corporation and provides all of the timing and control signals required to provide pulse width modulated switching signals to maintain the 5 volt output of secondary winding 35 at the desired 5 volt reference level. The switching signals are coupled through the isolation transformer 31 to the inverter X1.

The second set of secondary windings 36 of the transformer 32 are coupled through a pair of rectifying diodes to an inductor winding 46 of the inductor 42 to a +12 volt output and through a further pair of rectifying diodes and a winding 48 of the inductor 42 to an opposite polarity −12 volt output.

A further winding 44 of the inductor 42 has a number of turns selected to provide an approximately 30 volt charging voltage which is communicated through a rectifying diode 60 and a filter capacitor 62 which provides a connection to ground. This provides a filtered charging voltage signal which is communicated through a one amp current limiting voltage regulator 68 to a positive terminal (via line 5) of an auxiliary power supply, which in this case is a pair of series connected 12 volt lead acid batteries 64, 66. The voltage regulator 68 is designed to provide a battery float voltage of approximately 27.4 volts which is sufficient to maintain a substantially full charge on the normal 24 volt battery 64, 66 without inflicting overcharge damage.

In AC mode, under normal operating conditions, AC power is received through the main power switch 13 and is passed through the EMI filter 14 to the AC to DC converter 16 and the switching circuit X1. The AC to DC converter 16 converts the AC input power to either a 300 volt or a 385 volt DC rail voltage which is applied to the primary winding P of the transformer 32 with a duty cycle sufficient to maintain the +5 volt secondary output at the reference voltage of 5 volts. If the reference voltage drops slightly the pulse width modulator of unit 52 increases the duty cycle so as to increase the power through transformer 32 to maintain the regulated output voltage. Similarly, if the +5 volt reference should increase slightly, the duty cycle level is decreased until the output voltage returns to the +5 volt reference level. The turns ratio between the secondary windings 35, 36 and the primary winding P of the transformer 32 ensures that the secondary windings 36 provide the correct plus and minus 12 volt outputs when the +5 volt output is maintained at its reference voltage. At the same time, winding 44 of the power balancing inductor 42 provides a trickle charge signal which ensures that the batteries 64, 66 remain fully charged and ready for standby operation.

An internal power supply circuit 128 receives half wave rectified power from a diode 72 connected to secondary winding 36 which operates a low voltage detector or comparator 70, and provides power (V AUX) to various locations within the power supply circuit 10. A direct tap-off smoothed by a 10 μF capacitor 74 provides a substantially unregulated voltage 25VUR whilst a zener diode 128A and filter capacitor 128B provide a regulated 12 volt supply for low power usage.

In the event of a failure in the AC utility power supply, the energy held by the DC power rails 20, 22 quickly dissipates, the voltage output of the secondary winding 36 begins to drop along with that of secondary windings 35, and this drop is detected by the comparator 70 coupled thereto.

Comparator 70 has a first input coupled to the +5VREF reference voltage generated from the secondary winding 5 and a second input derived from V AUX which is delivered by the diode 72 via a pair of voltage divider resistors 76, 78 having values of 47K and 22K ohms respectively. The voltage divider circuit causes the voltage on the second input of the comparator to fall below 5V, and the comparator 70 to be actuated, when the nominal 25 volt output of the diode 72 drops below 15.68 volts. The filter capacitor 74 has a value of 10 μF to maintain the output of diode 72 above 15.68 volts under normal operating conditions, but to quickly discharge and reduce the output of diode 72 below 15.68 volts rapidly after a termination of input power.

Capacitor 74 is sufficiently small to permit the power loss to be detected before the 5 volt and 12 volt regulated outputs drop below specification requirements, which are typically plus or minus five percent.

When the input to comparator 70 from diode 72 drops below 5 volts to indicate a power failure, the output of comparator 70 goes high to trigger a 10 second one-shot multi-vibrator circuit 80. Upon being actuated, the one-shot circuit 80 sets and maintains an output signal for a fixed time of approximately 10 seconds. This output signal is coupled via unit 52 as an enable input to a power switch 82 and as a disable input to the battery recharging voltage regulator 68 (since there is a degree of power loss in the battery charging circuit it is inefficient to use the battery to recharge itself).

When enabled by the one-shot circuit 80, the power switch 82 operates in response to the pulse width control signals from the pulse width modulator of unit 52 to alternately drive opposite sides of the 12 volt secondary winding 36 of the transformer 32 with the nominal 24 volt auxiliary power from the batteries 64, 66. When in this backup mode, the pulse width modulator is controlled by a current feedback signal I3 from a sensing circuit Isense3 arranged to sense the current drawn from the batteries rather than by the signal I1 from Isense-1.

The power supplied to the secondary winding 36 of the transformer 32 from batteries 64, 66 is reflected through the transformer 32 to the other secondary winding 35 and through the transformer primary winding P back through the rectifying diodes 87, 88 to the plus and minus DC voltage power rails 20, 22.

The second pole 13C, 13D of the mains power switch 13 serves to prevent the one-shot circuit 80 from automatically commanding auxiliary power when the main power switch 13 is turned off. Without the second pole 13C, 13D, the comparator 70 would treat this loss or drop of power the same way as it would a power failure and cause the one-shot circuit output signal to command use of auxiliary power.

Duplication of circuitry is avoided by using the same pulse width modulator to regulate the secondary winding voltages during battery operation and normal AC to DC utility power operation. Furthermore, by driving the secondary winding 36 under battery power the use of additional windings, or even additional transformers, to couple the battery power into the regulated voltage windings is avoided. The uninterruptible feature of the power supply is thus provided by internal connection to a regulating AC source power supply without unnecessary additional cost or loss of power efficiency.

One of the problems associated with a power supply having internally connected auxiliary power is detection of a return of AC utility power. This is handled automatically by the comparator 70 and the 10 second one-shot circuit 80 in the present embodiment. As indicated previously, the 10 second one-shot circuit 80 enables the power switch 82 to provide battery power to the secondary winding 36 for a period of 10 seconds. At the end of that time, if AC utility power has not been restored, the energy stored by the filter capacitors of the AC to DC converter 16 will begin to dissipate and the nominal 25 volt output voltage from diode 72 and capacitor 74 will begin to drop. As soon as this voltage drops below 15.68 volts the comparator 70 will again become actuated and will activate the one-shot circuit 80 for another 10 second time interval. A test is thus conducted for return of AC utility power every 10 seconds. If AC power returns, the control voltage will not drop when the 10 second signal from the one-shot circuit 80 terminates and standby power will be automatically discontinued. The 10 second cycles will thus continue indefinitely until either the batteries 64, 66 become discharged or AC power is returned.

The auxiliary power source for the uninterruptible power supply 10 is thus automatically internally connected upon loss of AC utility power and automatically disconnected upon restoration of the utility AC power. All this occurs with no disruption of the regulated output voltages as these voltages are maintained within designed specification limits.

Referring now to FIG. 2B, the AC to DC converter 16 and inverter X1 are shown in detail. The AC to DC converter section 100 and the inverter section 102 are responsive to control signals transmitted via the isolation transformer 31. A pair of rectifying diodes 104, 105 charge holding capacitors 106, 107 for the DC voltage rails 20, 22. The capacitors have their junction connected via a further capacitor to the primary winding P and are functionally equivalent to the capacitor 17 of FIG. 1, while two transistors 110, 111 operate as inverters to selectively couple the primary winding P to the high and low voltage rails 20, 22 respectively. FIG. 2A is similar to FIG. 2B but uses a full wave rectifying bridge and inductor L1 at the input end of the convertor.

Figure 3:
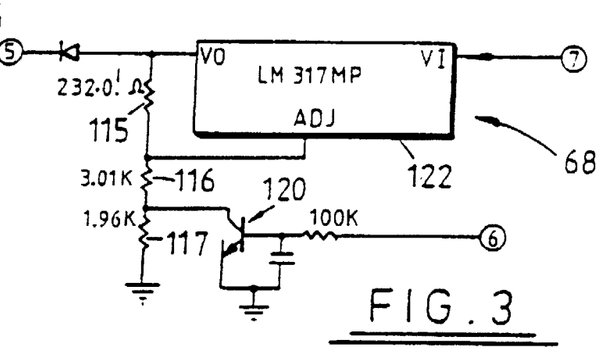
FIG. 3 shows a charging circuit of the power supply of FIG. 1.

The voltage regulator 68 is shown in somewhat greater detail in FIG. 3, to which reference is now made. The disabling of the voltage regulator which is formed by a LM317MP circuit 122 is accomplished by connecting the ground input (ADJ) to a voltage divider circuit having a 232Ω, a 3.01KΩ and a 1.96KΩ resistor chain 115, 116, 117 connected in series between the output voltage line (VO) and ground. The ground terminal of the LM317MP circuit is connected between the 232Ω resistor 115 and the 3.01KΩ resistor 116. Upon activation of the output VO from the 10 second one-shot circuit S0 via line 6, a transistor 120 is turned on to short out the 1.96KΩ resistor 117. This pulls the voltage of the ground terminal of the LM317MP voltage regulator circuit 122 sufficiently low that the circuit 122 turns off and provides no further charging current to the batteries 64, 66.

Figure 4:
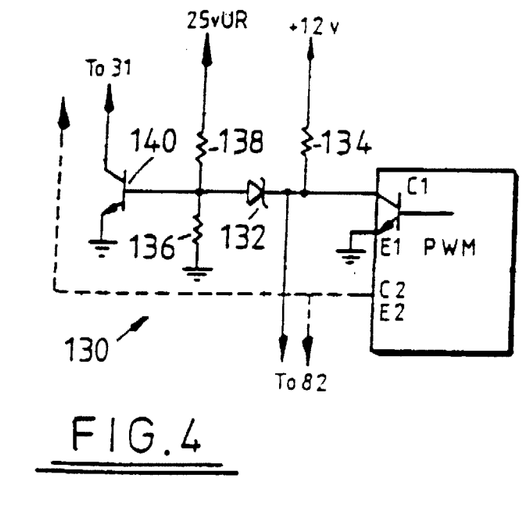
FIG. 4 shows an isolation circuit of the power supply of FIG. 1.

Referring now to FIG. 4, there is shown an isolation circuit 130 forming part of unit 52 which enables the pulse width modulator to have an open collector output C1 connected to isolation transformer 31 and power switch 82 by separate connections having different pull-up voltages. A similar isolation circuit is connected to the collector output C2 to provide the other connection to transformer 31 and power switch 82. The C1 output of the pulse width modulator is connected to a cathode of a Schottky diode 132 and through a pull-up resistor 134 to 12 volts provided by voltage supply circuit 128. The annode of the Schottky diode 132 is connected through a voltage divider resistor 136 to ground, through a voltage divide resistor 138 to the 25 VUR terminal, and to the base of a transistor 140. Schottky diode 132 has a sufficiently low voltage drop that when output C1 turns on, transistor 140 turns off. The collector of the transistor 140 thus represents a logical inversion of the output terminal C1. The voltage dividers 136, 138 are selected to maintain transistor 140 biased on, when the output C1 presents a high impedance.

The DC input operating mode of the auxiliary power supply of FIG. 1 will now be described.

Referring to FIG. 1, a double pole, single throw, DC power switch X10 has a first terminal X10A shown closed against a contact X10B to conduct power from the DC input in the voltage range 18–70V to a small capacitive EMI filter X11. The second pole contacts X10C, X10D of switch X10 are wired in a similar fashion to the AC power switch 13 to the output of the one-shot 80.

Figure 2C:
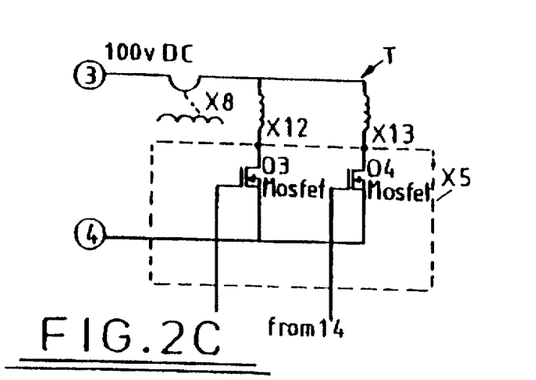
FIG. 2C shows a push-pull converter of the power supply of FIG. 1.

In the DC mode, a DC to DC converter 15 connected to the output of filter X11 boosts the DC I/P, typically 18V, to approximately 100V on line 3. A push-pull switching circuit X5, shown in more detail in FIG. 2C, is coupled to the converter 15 to receive the output therefrom and includes transistors Q3 and Q4 which selectively and alternately couple winding terminals X12, X13 of a tertiary winding T of the transformer 32 to the isolated power ground in response to pulse width modulated switching control signals generated by the pulse width modulator and transmitted via an isolation transformer X14. The tertiary winding T of the transformer 32 has a centre tap connected to the 100V on line 3 and is thus continually energised with a pulse width modulated 100V DC signal. The duty cycle of the pulse width modulation is selected to maintain a selected reference voltage at one of the outputs of the power supply 10. In the DC input mode the pulse width modulator circuit of unit 52 is controlled by a current sensing circuit Isense2 coupled to the tertiary winding of the transformer which delivers a current feedback signal I2.

A feature of the DC mode of operation is its use of the AC input filter capacitor 17 to achieve the same hold up time as is possible in the AC mode of operation. The power supplied to the tertiary winding T of the transformer 32 is reflected through the transformer primary winding P, back through the rectifying diodes 87, 88, to the plus and minus DC voltage power rails 20, 22 so that the input filter capacitor 17 is fully charged.

The need for a second hold-up capacitor in the DC input circuit is therefore eliminated. This is especially significant as, in order to store the same amount of energy as the "AC" hold-up capacitor 17 which operates at 300 or 385V, a "DC" hold-up capacitor connected between the output lines 3, 4 of the DC to DC converter 15 and operating at 100V would require to have at least 3 times the volume of the "AC" capacitor.

Providing that both AC and DC inputs are available, when the supply circuit is operating in the DC mode, a comparator in the detection and control circuit 52 senses (via the input DC detect) any abnormalities in the DC input and switches to AC mode when the DC input falls outside acceptable limits. If the DC recovers and is within specification then control logic returns operation to the DC mode; if not then the supply enters a backup mode. If the DC recovers whilst in backup mode then the supply will return to DC mode.

The DC mode makes use of the same control circuitry on the secondary side of the transformer described with reference to the AC mode.

Figure 5:
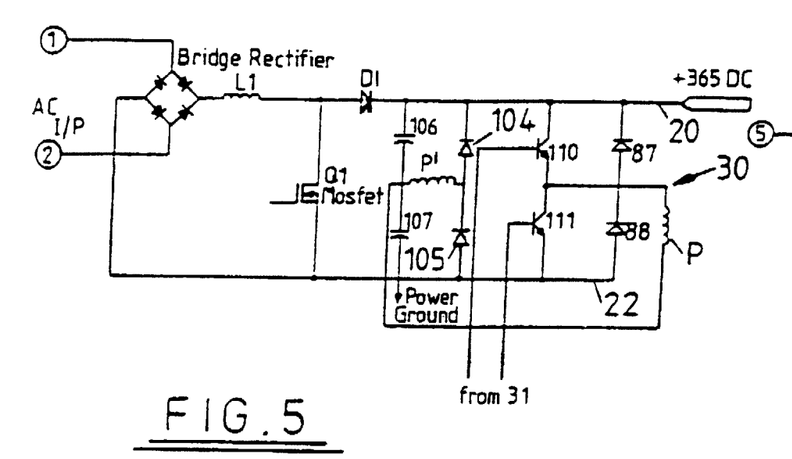
FIG. 5 shows a half bridge switching circuit of the power supply of FIG. 1.

It will be appreciated that various modifications may be made to the above described embodiment without departing from the scope of the invention. For example FIG. 5 shows an alternative configuration of the half bridge switching circuit X1, having a clamping winding $P^1$ connected between clamping diodes 104, 105 and the junction of storage capacitors 106, 107 which prevents magnetic saturation of the main transformer caused by the pulse by pulse nature of current mode control.

Figure 6:
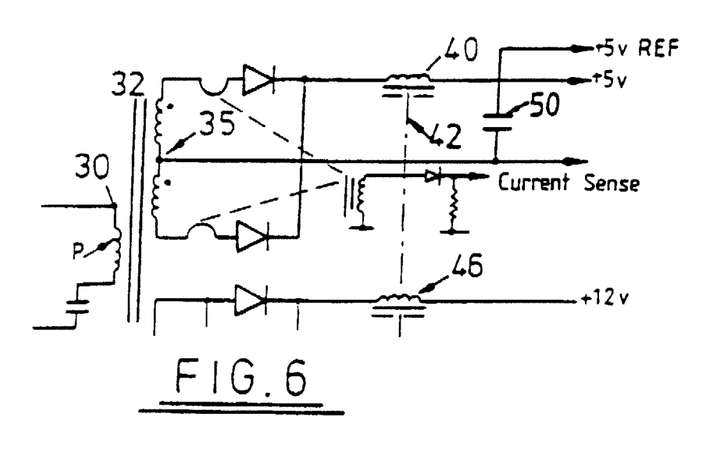
FIG. 6 shows a secondary side current sensor of the power supply of FIG. 1.

FIG. 1 shows the use of three separate current sensors Isense1, 2, 3 for AC mode, DC mode and Backup mode respectively, each delivering to unit 52. These can be combined as shown in FIG. 6 to produce secondary side current sensing. This has the advantage of having all current sensing on the secondary side and the magnitude of the current sense signal irrespective of the mode of operation is always the same. There is no need to match up the current sense signals for each of the three modes.

The embodiment shown in FIG. 1 can be adapted for voltage mode operation by changing the push-pull switching circuit X5 to a half bridge switching circuit, removing the current sensors Isense1, 2, 3, and the adding a voltage feed-forward signal to the PWM part of the control circuitry 52 derived from the peak voltage presented by the winding 35 to the rectifying diode of the 5V output.

From FIG. 1 the 1 amp voltage regulator 68 may be adapted to charge a Nickel Cadmium battery pack whilst monitoring battery voltage and temperature.

Figure 7:
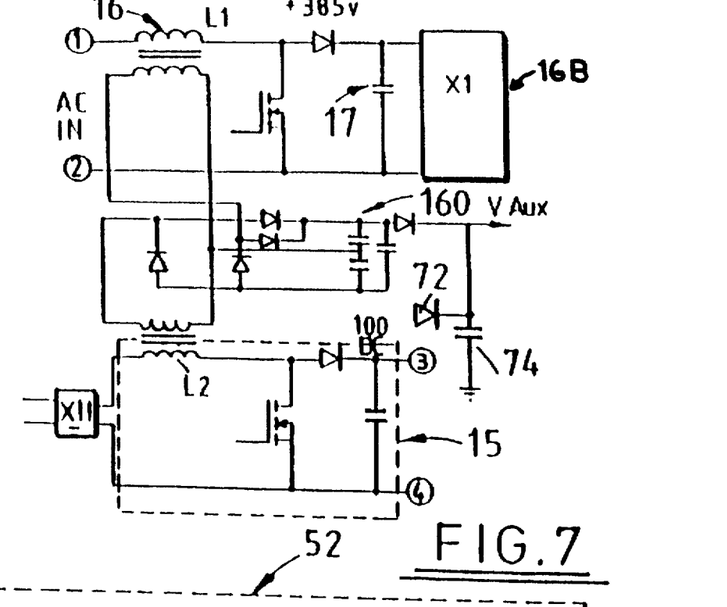
FIG. 7 shows a circuit for generating auxiliary supplies in a "sleep mode" of the power supply of FIG. 1.

To operate in a "sleep mode" facility, auxiliary supplies must be generated from the AC and DC inputs. FIG. 7 shows the adaptation of the boost inductors L1 and L2 of convertor 16 and DC/DC convertor 15 to have auxiliary windings which provide auxiliary power when the main outputs from the UPS 10 are off. These power outputs are diode mixed by a diode and capacitor assembly 160 so that as long as one AC or DC input is present then auxiliary power is available. They are also mixed with V AUX such that V AUX will take over supplying auxiliary power when the main outputs from the UPS 10 are enabled.

Figure 8:
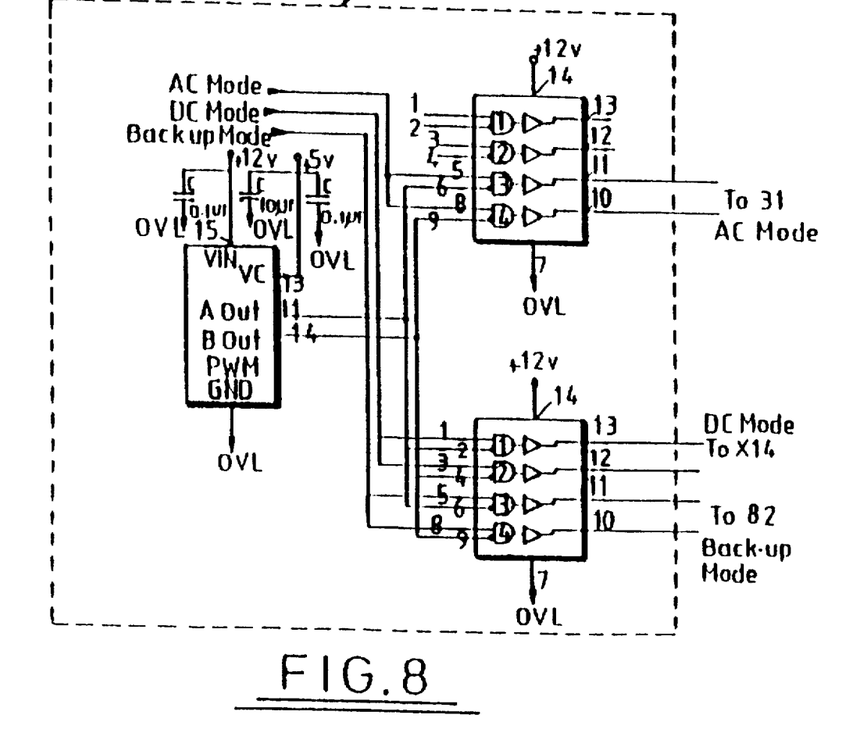
FIG. 8 shows, in schematic form, circuitry for controlling the gating of the PWM signals of the power of supply of FIG. 1.

Also, in order to operate in a "sleep mode", the power switches shown in FIG. 1 as 13 and X10 are removed and extra control is employed to select the required start-up mode and backup requirements. FIG. 8 shows a configuration of unit 52 where the PWM is gated out to the required switching network depending on which one of the three modes is selected.

We claim:

1. An uninterruptible power supply having an output comprising:

first and second sower inputs for receiving AC and DC power respectively;

first and second switching circuits each having a switching circuit input and a switching circuit output, the switching circuit inputs of the first and second switching circuits being coupled to and receiving power from the first and second power inputs respectively;

an auxiliary power supply coupled to said first and second inputs;

a transformer having a primary winding coupled to the output of the first switching circuit, a tertiary winding coupled to the output of the second switching circuit, and at least one secondary winding providing power at a regulated DC voltage to the output of the uninterruptible power supply;

a selection circuit selectively providing power from at least one of the first switching circuit, the second switching circuit, and the auxiliary power supply, to the output of the uninterruptible power supply;

an AC to DC converter having an input coupled to the first power input and an output coupled to the first switching circuit, the AC to DC converter generating an output voltage at the output of the AC to DC converter when power is available at the input of the AC to DC converter; and a hold-up capacitor connected to the output of the AC to DC converter and arranged to maintain the output voltage at the AC to DC converter at an operational level for a predetermined time after an AC input voltage at the first input falls below a selected level, the first switching circuit being arranged to couple power from the transformer to the hold-up capacitor for storage on the hold-up capacitor in response to power received by the transformer from the output of the second switching circuit.

2. A power supply according to claim 1, wherein the auxiliary power supply has an output that is coupled to the secondary winding of the transformer.

3. A power supply according to claim 2 further comprising a third switching circuit coupled between the auxiliary power supply and said secondary winding of the transformer, the third switching circuit being controlled by the selection circuit.

4. A power supply according to claim 1, wherein the hold-up capacitor has a voltage that is greater than a voltage at the input to the second switching circuit.

5. A power supply according to claim 1 wherein the first and second switching circuits are each arranged to generate a substantially square wave signal when selected, and wherein the power supply further comprises a pulse width modulator that controls the pulse width of the square wave.

6. A power supply according to claim 1, further comprising a rectifying circuit coupled to each secondary winding of the transformer, the rectifying circuit providing regulated DC power at the power supply output in response to power received from the secondary winding of the transformer.

7. A power supply according to claim 1, further comprising a DC to DC converter coupled between the second power input and the second switching circuit.

8. A power supply according to claim 3, wherein the selection circuit provides user selection of either an AC or DC normal operating mode in which power is taken from the first or second switching circuit in response to user selection of the first or second input respectively and wherein power is taken from the third switching circuit, associated with the auxiliary power supply, in the event that the power available from the selected input falls below a predefined limit.

9. A power supply according to claim 1, wherein the second input is arranged to receive DC power having a voltage of between 18V and 70V.

10. A power supply according to claim 1, wherein the auxiliary power supply comprises at least one battery.

11. An uninterruptible power supply having a first power supply input for receiving power from an AC source, a second power supply input for receiving power from a DC source and a power supply output providing regulated DC power, the power supply comprising:

an AC to DC converter having an AC to DC converter input coupled to the first power supply input and an AC to DC converter output, the AC to DC converter providing power having a DC output voltage to the AC to DC converter output in response to power received at the AC to DC converter input when power is available at the AC to DC converter input;

a transformer having a primary transformer winding, a secondary transformer winding coupled to the power supply output and a tertiary transformer winding;

a first switching circuit having a first switching circuit input selectively coupled to the AC to DC converter output and a first switching circuit output coupled to the primary transformer winding, the first switching circuit receiving a first switching control signal and providing power to the primary transformer winding when power is available at the first switching circuit input in response to the first switching control signal and in response to power received at the first switching circuit input;

a second switching circuit having a second switching circuit input selectively coupled to the second power supply input and a second switching circuit output coupled to the tertiary transformer winding, the second switching circuit receiving a second switching control signal and providing power to the tertiary transformer winding when power is available at the second switching circuit input in response to the second switching control signal and in response to power received at the second switching circuit input;

a battery providing a source of auxiliary power;

a third switching circuit having a third switching circuit input coupled to the source of auxiliary power and a third switching circuit output coupled to the secondary transformer winding, the third switching circuit receiving a third switching control signal and providing power to the secondary transformer winding in response to the third switching control signal and in response to power received at the third switching circuit input when power is not available at either the first switching circuit input or the second switching circuit input;

a selection circuit selectively coupling the first switching circuit input to the first power supply input or the second switching circuit input to the second power supply input and coupling the third switching circuit input to the source of auxiliary power when one of the first and second switching circuit inputs is coupled respectively to the first or second power supply input;

a hold-up capacitor coupled to the AC to DC converter output, the hold-up capacitor receiving power from the AC to DC converter when power is available at the AC to DC converter input, receiving power from the primary transformer winding when power is available from either the second switching circuit output or from the source of auxiliary power and providing power to the first switching circuit input when power is not available from the AC to DC converter output, the second switching circuit output or from the source of auxiliary power; and a control circuit generating the first, second and third switching control signals, the first, second and third switching control signals being generated to maintain a regulated voltage at the power supply output.

12. An uninterruptible power supply having a first power supply input for receiving power from an AC source, a second power supply input for receiving power from a DC source and a power supply output providing regulated DC power, the power supply comprising:

an AC to DC converter having an AC to DC converter input coupled to the first power supply input and an AC to DC converter output, the AC to DC converter providing power having a DC voltage to the AC to DC converter output in response to power received at the AC to DC converter input when power is available at the AC to DC converter input;

a transformer having a primary transformer winding, a secondary transformer winding coupled to the power supply output and a tertiary transformer winding;

a first switching circuit having a first switching circuit input selectively coupled to the AC to DC converter output and a first switching circuit output coupled to the primary transformer winding, the first switching circuit receiving a first pulse width modulated switching control signal and providing power to the primary transformer winding when power is available at the first switching circuit input in response to the first pulse width modulated switching control signal and in response to power received at the first switching circuit input;

a second switching circuit having a second switching circuit input selectively coupled to the second power supply input and a second switching circuit output coupled to the tertiary transformer winding, the second switching circuit receiving a second pulse width modulated switching control signal and providing power to the tertiary transformer winding when power is available at the second switching circuit input in response to the second pulse width modulated switching control signal and in response to power received at the second switching circuit input;

a battery providing a source of auxiliary power;

a third switching circuit having a third switching circuit input coupled to the source of auxiliary power and a third switching circuit output coupled to the secondary transformer winding, the third switching circuit receiving a third pulse width modulated switching control signal and providing power to the secondary transformer winding in response to the third pulse width modulated switching control signal and in response to power received at the third switching circuit input when power is not available at either the first switching circuit input or the second switching circuit input;

a selection circuit selectively coupling either the first switching circuit input to the first power supply input or the second switching circuit input to the second power supply input and coupling the third switching circuit input to the source of auxiliary power when one of the first and second switching circuit inputs is coupled respectively to the first or second power supply input;

a hold-up capacitor coupled to the AC to DC converter output, the hold-up capacitor receiving power from the AC to DC converter output when power is available at the AC to DC converter input, receiving power from the primary transformer winding when power is available from either the second switching circuit output or from the source of auxiliary power and providing power to the first switching circuit input when power is not available from the AC to DC converter output, the second switching circuit output or from the source of auxiliary power; and a pulse width modulation control circuit generating the first, second and third pulse width modulated switching control signals, the first, second and third pulse width modulated switching control signals being generated to maintain a regulated voltage at the power supply output.

* * * * *